INVENTORS
JOHN L. NISBET and
HUBERT C. WOODALL, JR.

BY Parrott, Bell, Seltzer, Park & Gibson

ATTORNEYS

April 4, 1972   J. L. NISBET ET AL   3,654,056
FINISHED GLASS TEXTILE MATERIALS AND METHOD OF FORMING SAME
Filed Sept. 17, 1969   3 Sheets-Sheet 3

INVENTORS
JOHN L. NISBET and
HUBERT C. WOODALL, JR.

BY Parrott, Bell, Seltzer, Park & Gibson

ATTORNEYS

United States Patent Office 3,654,056
Patented Apr. 4, 1972

3,654,056
FINISHED GLASS TEXTILE MATERIALS AND
METHOD OF FORMING SAME
John L. Nisbet and Hubert C. Woodall, Jr., Winston-Salem, N.C., assignors to Carolina Narrow Fabric Company, Winston-Salem, N.C.
Continuation-in-part of abandoned application Ser. No. 764,303, Oct. 1, 1968. This application Sept. 17, 1969, Ser. No. 858,796
Int. Cl. D05c 17/02
U.S. Cl. 161—62
23 Claims

ABSTRACT OF THE DISCLOSURE

A producer-sized fiber glass material, such as yarn, is chemically desized with a size converting enzyme and the material is then finished, as by applying a resin bonded pigment finish thereto, to form a product of higher strength, flexibilty and abrasion resistance than former products desized and finished in accordance with conventional techniques.

---

This application is a continuation-in-part of application Ser. No. 764,303 filed Oct. 1, 1968, now abandoned.

This invention relates to glass textile materials, and more particularly to a novel method of finishing such materials which, in addition to imparting the desired finish thereto, also results in imparting increased strength, flexibility and abrasion resistance to the end product.

Glass textile materials or fiber glass materials, such as yarns, and fabrics made therefrom, are well known. Typically, fiber glass yarns are made by extruding molten glass into filaments or fibers which are then drawn and joined with other similar fibers to form the desired yarn. Bare glass is its own worst enemy, and thus, abrasion between bare glass filaments must be avoided as much as possible. To this end, a size is applied to glass fibers as soon as possible after extrusion to protect the fibers by forming a protective size coating thereon and by binding them together into a multifilament yarn. Usually, this size is a starch size similar to those conventional starch sizes commonly used in other textile operations. However, other sizes might be advantageously employed.

Although the application of size serves well its function of protection of the glass fibers and yarns during handling and until they are formed into a fabric, the presence of the size nevertheless presents a problem, since it inhibits the proper application of the desired finish to the fabric. For example, because glass is virtually inert with respect to the usual textile dyestuffs, the usual finish applied to fiber glass fabrics is normally some form of resin base coating or "resin bonded pigment" coating designed to impart the desired color and/or "hand" to the fabric. Thus, the surface of the glass fibers must be cleaned in order to permit direct bonding between the resin and the glass surface, and therefore, the size, having now served its function of protecting the fibers until they are woven or knitted together into fabric, must then be removed if a satisfactory bond is to be obtained between the resin base finish and the glass.

The accepted practice of desizing glass textiles has heretofore been to apply elevated temperatures (in the neighborhood of 750° F. or above) to fabrics consisting of previously sized fiber glass yarns to, in effect, desize by burning or vaporizing the size while leaving only a small carbon residue in the fabric. Such method is commonly referred to as "heat cleaning" or "Coronizing." This heat cleaning process serves fairly acceptably to clean the glass so as to permit application of the desired finish but, by the same token, it creates a significant problem in that such treatment significantly degrades the strength, flexibility and abrasion resistance of the yarns, and thus the strength and versatility of the fabric. Therefore, the usual finisher of fiber glass fabrics has up until now been faced with the dilemma of choosing between (1) a strength degraded, relatively brittle, fabric with a high quality tenacious finish, or (2) a relatively strong and versatile fabric which has not been completely desized and which has a relatively low quality, and not particularly durable, finish applied thereto.

Additionally, the heat cleaning process renders the glass somewhat plastic, and the configuration of the yarns when heated is set or fixed, i.e. the woven crimp or knitted stitches are set in the fabric. While this phenomenon may not be undesirable in all cases, it does tend to stiffen and set the fabrics, particularly when such may not necessarily be desired.

In accordance with the present invention, we have found that desized and finished fiber glass textile materials of extremely high quality and strength with a high degree of flexibility and abrasion resistance can be produced without the necessity of using a heat cleaning process for desizing. Basically, this is accomplished by chemically desizing the fiber glass material with, for example, a starch or other size-converting enzyme, which renders the size soluble and thereby permits it to be washed away from the fiber glass material. Unlike heat cleaning, such chemical desizing does not degrade the strength of the fiber glass with the result that much stronger, high quality, finished fiber glass products are now obtainable. Additionally, such chemical desizing tends to result in obtaining a cleaner fiber glass material than is obtainable with heat cleaning since chemical cleaning does not leave a carbon residue which tends to reduce the quality of a subsequently applied finish.

The chemical desizing of fiber glass fabrics can be carried out with a minimum of handling of the fabric, as by washing the fabric with the desizing solution. Thus, fiber glass fabrics can be chemically desized in batch or continuous process and then immediately be finished as by applying a resin bonded pigment finish thereto with the result that such finished fabric possesses much more strength and flexibility than a similar heat cleaned and finished fabric.

Additionally, and perhaps more significantly, it is within the scope of the present invention to produce finished fiber glass yarns which have been heretofore unknown in the art due to the fact that it has been necessary to retain the protective size on the yarn until it is formed into a fabric. More specifically, as will be readily apparent to those skilled in the textile art, the ability to produce finished (or dyed) fiber glass yarns capable of being formed into fabrics permits infinitely greater fabric styling possibilities since yarns of various colors can be used to form the cloth with the desired pattern in the first instance, rather than relying upon printing to obtain a design. Additionally, the ability to produce yarns in finished form opens up new fields of use for fiber glass, as for example, in the pile carpets, where heretofore it was not possible to heat clean a pile carpet and then apply a resin bonded pigment finish thereto and produce an acceptable product.

The production of such finished fiber glass yarns can be accomplished by chemically desizing the fiber glass yarn in wound package form by using a conventional yarn package dyeing machine which is capable of forcing a treatment solution (or in this case a desizing solution) through the yarn packages. After desizing, each individual yarn end can then be finished, as for example by padding a dye-containing resin finish on a running length of such yarn, curing the resin and rewinding the yarn onto another package, all in a continuous operation. Alternatively, the yarn could be finished in package form by forcing the finish through the yarn packages. In either case, the thus finished yarn can then be woven or knitted into fabric in the conventional manner, and even though the size has been removed, the finished yarn, by virtue of its being virtually completely coated or impregnated with finish, is much stronger, flexible and more protected than it would be merely with the size coating thereon.

The tensile strength of desized and finished fiber glass yarns produced in accordance with this invention runs as much as 130% to 200%, or higher, of the strength of comparable producer-sized fiber glass yarns. This added strength, coupled with an increase in flexibility and abrasion resistance and coupled with the fact that the strength of fabrics containing such yarns need not be degraded by heat cleaning, should make it readily apparent that the instant invention permits the formation of fiber glass fabrics of much higher strength and quality, with higher quality, more tenacious, finishes of much more variety than have been heretofore possible.

The terms "finish," "finished" and "finishing" have been and will be used herein in their broad textile sense to refer to any type of treatment applied to a fiber glass yarn or fabric to impart a desired lasting property to the yarn or fabric. Thus, a finish could consist merely of a dyestuff applied to impart a desired color; and/or resin or coating, such as "Teflon," applied to impart a desired "hand" or property; or a combination of both, as would be the case if the finish were a resin bonded pigment containing a particular additive designed to impart a certain "hand" to the yarn or fabric.

The drawings schematically illustrate typical examples of glass fiber textile materials which may be fabricated according to the teachings of the present invention. Briefly described, FIGS. 1-3 are enlarged plan views of woven fabric materials;

Figure 1:
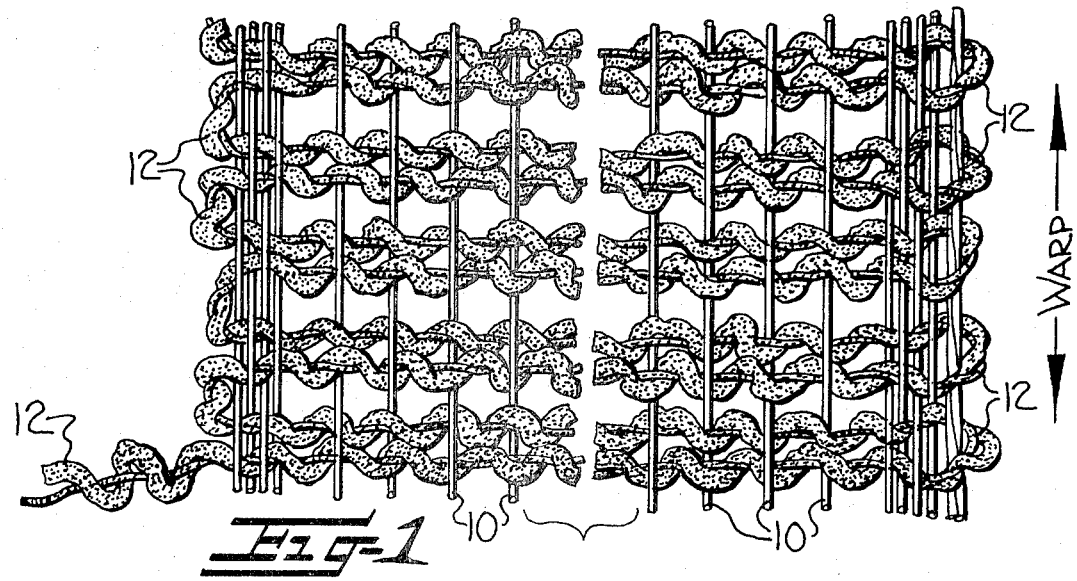

The following are specific non-imiting examples of a process embodying the present invention; unless otherwise noted, all percentages of chemicals referred to are based upon the weight of the particular bath:

EXAMPLE I 36-three pound "milk bottle" packages of 150/4/5 S starch sized continuous filament fiber glass yarn are formed on hollow perforated dye tubes with a wind which will result in a minimum of abrasion when the yarn is unwound from the package. The packages were then loaded into a conventional yarn package dyeing machine having a 300 gallon capacity.

Wetting out and scouring

To penetrate and wet-out the starch coating, the yarn packages were then scoured for 10 minutes at 180° F. in an aqueous bath containing .10% "Triton-X-100," a nonionic surfactant marketed by Rhom and Haas and identified as an alkyl aryl polyether alcohol prepared by the reaction of t-octylphenol with ethylene oxide and having an average polyoxyethylene chain length of 9 to 10. The bath is then dropped. The above surfactant will also serve to wash away any polyvinyl alcohol size which may be present with the starch.

Desizing bath

The loaded dyeing machine was again filled with 300 gallons of water at 180° F. to which was added a desizing formulation as follows:

Ingredient:                                   Amount, percent
(a) Stabilizing agent for the enzyme (common salt (NaCl)) _____ .54
(b) Surfactant ("Triton-X-100") (Rhom and Haas) (identified previously) _____ .10
(c) pH adjusting agent (sodium acetate) _____ .02
(d) A previously filtered desizing enzyme ("Rhozyme GC Extra") (a diastatic enzyme marketed in liquid form by Rhom and Haas and filtered prior to using. Significant properties of the product are: 6000 FM units minimum activity; 1870 BAU units minimum activity; 9.5 lb./gal. density at 25° C.; 1.14 specific gravity at 25° C.; pH 6.0 (as packed); 5 cps. Brookfield viscosity at 25° C. (as packed) (#1 spindle, 60 r.p.m.); freezing point—slush +14° F., solid—4° F.; and being water-dilutable in all proportions _____ .27

This bath was forced through the packages for a period of 30 minutes with 5 minute cycle shifting whereupon desizing was completed. The bath was then dropped.

FM units (sometimes referred to as Rhofon or liquefying units) may be defined as follows: An enzyme with 1000 FM units will reduce the viscosity of 300 times its weight of potato starch or 560 times its weight of tapioca starch by 90% in 10 minutes at 70° C. and pH 6.7. BAU units are measured by Standard Test Method AATCC 103-1965, Assay of Bacterial Alpha-Amylase Enzymes Used in Desizing.

Washing

For washing the desized yarn, the machine was again filled with water at 180° F. containing .10% "Triton-X-100" (Rhom and Haas) whereupon the packages were then scoured for 20 minutes. This bath was then dropped and the packages were subjected to a plain hot water (180° F.) wash for 10 minutes and then a hot running water (180° F.) wash to clear the bath.

Lubricating bath

The desized and washed packages were next subjected for 10 minutes to an aqueous lubricating bath containing .07% "Lubricant 3930" (Rhom and Haas) emulsion, which product is identified as ethylhexylnitrilotripropionate.

The desized and lubricated packages of yarn were then extracted and dried in a manner conventional for other types of textile yarns.

Finishing

For finishing, a conventional narrow fabric or ribbon dyeing machine, modified where necessary to accommodate yarn, was used to apply and cure a resin bonded pigment, finish to the yarns.

More specifically, the desized, dry yarn packages were mounted in a creel whereupon the yarn end from each package was led through appropriate tension devices into alignment with the other yarn ends to form a relatively narrow sheet of yarns. The sheet of yarns was then passed (1) through a first padding station set for 50% pick-up where an orange pigment-containing resin bath finish at room temperature was padded onto the yarns; (2) through a first heat curing oven adapted to raise the temperature of the padded finish up to 325° F. to 375° F. and to maintain such temperature for 30 seconds; (3) through a second padding station set for a 50% pick-up where a finish bonding agent at room temperature was padded onto the yarns; (4) through a second heat curing oven adapted to again raise the temperature of the padded material up to 325° F. to 375° F. and to maintain such temperature for 30 seconds, whereupon the finishing of the yarns with a desired orange color was completed. The moving sheet of yarns was then again separated and the individual, finished yarns were individually rewound into separate packages by a conventional winding machine situated at the output end of the finishing machine.

The finish applied at the first padding station consisted of a 50 lb. aqueous formulation containing:

Ingredient: Amount, lbs.
(a) Resin Binder ("Rhoplex K 3") (Rhom and Haas) (ethylbutyl acrylate) _____ 2.500
(b) Coupling agent ("A–187 Silane") (Union Carbide) (gamma glycidoxypropyltrimethoxysilane) _____ 0.250
(c) Lubricant ("Lube 3930") (Rhom and Haas) (previously identified) _____ 1.375
(d) Surfactant ("Triton X–155") (Rhom and Haas) alkylarylpolyetheralcohol _____ 0.075
(e) Anti-migrant ("Kelgin MV") (Kelco Co.) (1% stock solution) (sodium alginate) _____ 3.00
(f) Pigments:
   (1) ("Metropad Yellow G") (Metro-Atlantic) Pigment Yellow 17; C.I. No. 21105) _____ 5.00
   (2) ("Carmine FFY") (Harshaw) (Pigment Red 5; C.I. No. 12490) _____ 2.00

The after treatment or bonding agent applied at the second adding station was a 25 lb. aqueous formulation containing 0.5 lb. "Atcovex Q" (Metro-Atlantic) (Stearato Chromic Chloride), a cross-linking agent for aiding in binding the resin finish to the glass.

EXAMPLE II

Five like quantities of similar fiber glass yarns were desized and finished with other colors by following the foregoing procedures with the substitution of other pigments as follows:

Amount, lbs.
(a) Finished Color—Turquoise:
   (1) "Monastral Blue B" (Du Pont) (Pigment Blue 15; C.I. No. 74160) _____ 1.500
   (2) "Metropad Yellow G" (Metro-Atlantic) (Pigment Yellow 17; C.I. No. 21105) _____ 0.250
(b) Finished Color—Gold:
   (1) "Metropad Yellow G" (Metro-Atlantic) (Pigment Yellow 17; C.I. No. 21105) _____ 0.360
   (2) "Aridye Padding Yellow K" (Interchemical) (Iron Oxide Yellow; RB 92) _____ 0.720
   (3) "Aridye Padding Grey 2K" (Interchemical) (Carbon Black; RB10) _____ 0.014
(c) Finished Color—Dark Brown:
   (1) "Carmine FFY" (Harshaw) (Pigment Red 5; C.I. No. 12490) _____ 2.500
   (2) "Metropad Yellow G" (Metro-Atlantic) (Pigment Yellow 17; C.I. No. 21105) _____ 3.500
   (3) "Aridye Padding Grey 2K" (Interchemical) (Carbon Black; RB10) _____ 0.600
(d) Finished Color—Green
   (1) "Metropad Yellow G" (Metro-Atlantic) (Pigment Yellow 17; C.I. No. 21105) _____ 2.750
   (2) "Monastral Blue B" (Du Pont) (Pigment Blue 15; C.I. No. 74160) _____ 0.105
   (3) "Aridye Padding Grey 2K" (Interchemical) (Carbon Black; RB10) _____ 0.80
(e) Finished Color—Dark Blue
   (1) "Monastral Blue B" (Du Pont) (Pigment Blue 15; C.I. No. 74160) _____ 7.000
   (2) "Carmine FFY" (Harshaw) (Pigment Red 5; C. I. No. 12490) _____ 1.000

It will occur to those skilled in the art that many equivalent chemicals might be substituted in the heretofore specified formulations without significantly altering the results obtainable.

For example, many other desizing enzymes, both of the diastatic type for solubilizing starch sizes, as well as many proteases for protein sizes, are readily available and should be chosen for use based upon the particular size involved as well as other conditions of temperature, pH, etc. It should be noted, however, that the diastatic enzyme should preferably be filtered to remove solid particles before adding it to the desizing bath, since such solid particles normally contain impurities which, if not removed, tend to stain the fiber glass yarn.

Likewise, there is a wealth of other surfactants available in the art and the criteria for choosing the proper one are well known in the textile finishing art.

The use of stabilizing and pH adjusting agents in the desizing bath will be also dictated by conditions and circumstances and many alternative chemicals are available, if needed, as will be apparent to those skilled in the art. In this regard, it may be noted that the "Rhozyme GC Extra" enzyme is most efficient between pH 6 and 7.

The use of a lubricant is optional, but nevertheless preferred, since it serves to lubricate the filaments and prevent scratching and abrasion damage. Other lubricants than the one specifically identified are available for this purpose, one of the main criteria for choice of a lubricant being that it must be compatible with and not deleteriously affect the subsequently applied finish.

Other binders, coupling agents, anti-migrants and bonding agents suitable for use in heretofore conventional resin bonded pigment finish processes on fiber glass fabrics as well as many other types of finishes or coating materials will likewise be useful in finishing yarns and/or fabrics desized in accordance with the invention.

Naturally, the present invention is adaptable to a wide variety of fiber glass yarns, both of the conventional type as well as the novelty or bulked type. Similarly, it should be emphasized that the heretofore described methods of desizing and finishing may be applied to fabrics consisting of sized fiber glass yarns, as well as the yarns themselves.

In practicing the present invention, it is important to minimize the handling of the fiber glass yarn or fabric, particularly during and after desizing and until the finish is applied, since during this period, the fibers are exposed to themselves and abrasion damage is likely unless extreme caution is exercised. Of course, the desizing of such yarn or fabric in package form and the subsequent application of a finish to a running length thereof does so minimize the handling in that it involves only one winding step, but even so, great care through the use of proper tensioning devices, etc. must be exercised during this one winding step to prevent damage to the yarn or fabric.

It will be also understood that handling may be minimized even further by partially or completely finishing the yarn or fabric while it remains in package form. For example, an aqueous solution containing about ¼ to ½% coupling agent such as "A–187" silane could be forced through the package in the package dye machine immediately after the desizing operation. Upon drying, the yarn or fabric could be further coated with a suitable resin by a continuous padding operation as described above, with the coupling agent serving to in some degree protect and lubricate the fibers during the padding operation.

As stated previously, fiber glass yarns desized and finished in accordance with the present invention exhibit a tensile strength considerably in excess of that of comparable producer-sized fiber glass yarns, as well as a high degree of flexibility and abrasion resistance. Strength test results to this effect are set forth hereafter. In each of the tests, the strength of a control yarn (producer-sized) was compared wih the same yarn after having been desized and finished in accordance with the present invention. The control yarn had been bulked by the "Taslan" method (as described for example in U.S. Pat. No. 2,783,609) prior to testing. The particular finishing formulations used for the various yarns are identified by reference to previously identified examples, although it is to be understood that the yarns themselves are different. In each instance, the tests are standard skein break tests on 120 yard skeins and the results are given in terms of pounds necessary to break.

TEST I

Yarn A: Average breaking strength (lbs.)
- Producer-sized (control) _____ 255
- Green (Example II (d)) _____ 455
- Dark blue (Example II (e)) _____ 531
- Turquoise (Example II (a)) _____ 503
- Gold (Example II (b)) _____ 458
- Orange (Example I) _____ 551

TEST II

Yarn B: Average breaking strength (lbs.)
- Producer-sized (control) _____ 221
- Gold (Example II (b)) _____ 517
- Green (Example II (d)) _____ 488
- Orange (Example I) _____ 443
- Turquoise (Example II (a)) _____ 423
- Dark blue (Example II (e)) _____ 451

TEST III

Yarn C: Average breaking strength (lbs.)
- Producer-sized (control) _____ 249
- Gold (Example II(b)) _____ 335
- Orange (Example I) _____ 344
- Green (Example II(d)) _____ 370
- Turquoise (Example II(a)) _____ 333

TEST IV

Yarn D: Average breaking strength (lbs.)
- Producer-sized (control) _____ 242
- Gold (Example II(b)) _____ 317
- Green (Example II(d)) _____ 379
- Orange (Example I) _____ 328
- Turquoise (Example II(a)) _____ 346
- Dark Blue (Example II(e)) _____ 401

TEST V

Yarn E: Average breaking strength (lbs.)
- Producer-sized (control) _____ 164
- Dark Blue (Example II(e)) _____ 379
- Turquoise (Example II(a)) _____ 336
- Gold (Example II(b)) _____ 270
- Orange (Example I) _____ 279
- Green (Example II(d) _____ 308

As can be seen from the foregoing test results the yarns desized and finished in accordance with the present invention exhibit tensile strengths of about 130% to 230% of the original tensile strength of such yarns prior to desizing—a significant increase in strength. Additionally, since the use of such yarns omits the necessity for heat cleaning fabrics, it will be apparent that fabrics formed from such yarns will possess an even greater margin of added strength as compared with prior fabrics finished by conventional methods.

The improved strength of a chemically cleaned fiber glass material as compared to a heat cleaned material is evidenced by the following tests wherein two samples of material were subjected to the standard break test for glass fiber materials. Each sample comprised 6 inch wide woven fiber glass tape consisting of 75/2/2 S warp and filling yarns with 16 ends per inch and 14 picks per inch. Sample A was chemically cleaned pursuant to the teachings of the present invention and treated with "A-187" silane, while Sample B was heat cleaned in the conventional manner and treated with the same silane. The results, expressed in average breaking strength, were as follows:

| | Pounds | |
|---|---|---|
| | Sample A | Sample B |
| Test (1): | | |
| Warp direction | 380 | 110 |
| Filling direction | 360 | 110 |
| Test (2): | | |
| Warp direction | 321 | 187 |
| Filling direction | 247 | 146 |

To determine the flexibility and abrasion resistance of chemically cleaned glass fiber materials, the following tests were conducted. Those skilled in the art will appreciate the remarkable results obtained.

Flex-fold test

A 75/1/0 S dyed warp and filling glass fiber woven fabric which had been finished with a solution containing "A-174" silane (gamma-methacryloxypropyltrimethoxysilane produced by Union Carbide), 3% Atcovex Q, and with a 2½% Teflon add-on, was subjected to the MIT (1.5 kg. load) flex-fold test. The sample underwent 10,500 cycles before breakdown.

Abrasion test

A sample as described in the above flex-fold test was subjected to the standard Wyzenbeck TM 5304 test method. At 2 lbs. load and 2 lbs. tension, the sample underwent 10,000 cycles before breakdown. At 3 lbs. load and 4 lbs. tension, the sample underwent 8,750 cycles before breakdown.

It will thus be recognized that the novel method of the present invention provides valuable and novel end products—(1) finished (dyed, if desired) fiber glass yarn having superior flexibility and strength characteristics and which opens up infinite possibilities in fabric types and styling, (2) a fabric consisting of such finished yarns and which possess flexibility and strength far in excess of that previously obtainable, and (3) a fabric desized and finished after the weaving or knitting operation and which possesses similarly increased flexibility and strength. The above fabrics may be designed to comprise a blend of such fiber glass yarns and organic fiber yarns such as polyethylene or polyester, or a blend of fiber glass yarns and natural fiber yarns such as cotton or wool. In the case of fabric blends which are desized after the formation of the fabric, there is no danger of destroying the added yarns as would be the case in a conventional heat cleaning operation. Typical examples of such end products are illustrated in the drawings and described in the following paragraphs.

FIG. 1 illustrates a double pick plain woven fabric as produced on a needle type loom wherein the warp yarns 10 consists of 150/1/2 S. fiber glass producer-sized yarn. The size has not been removed and the yarns possess their natural silver-like color. The filling yarn 12 comprises two strands of 75/1/0 S. fiber glass yarn which has been bulked by the aforementioned Taslan method and plied into one novelty yarn. The filling yarn was desized and dyed orange as per Example I, prior to the weaving operation. The resulting fabric presents a pleasant two-color appearance not heretofore obtainable.

Figure 2:
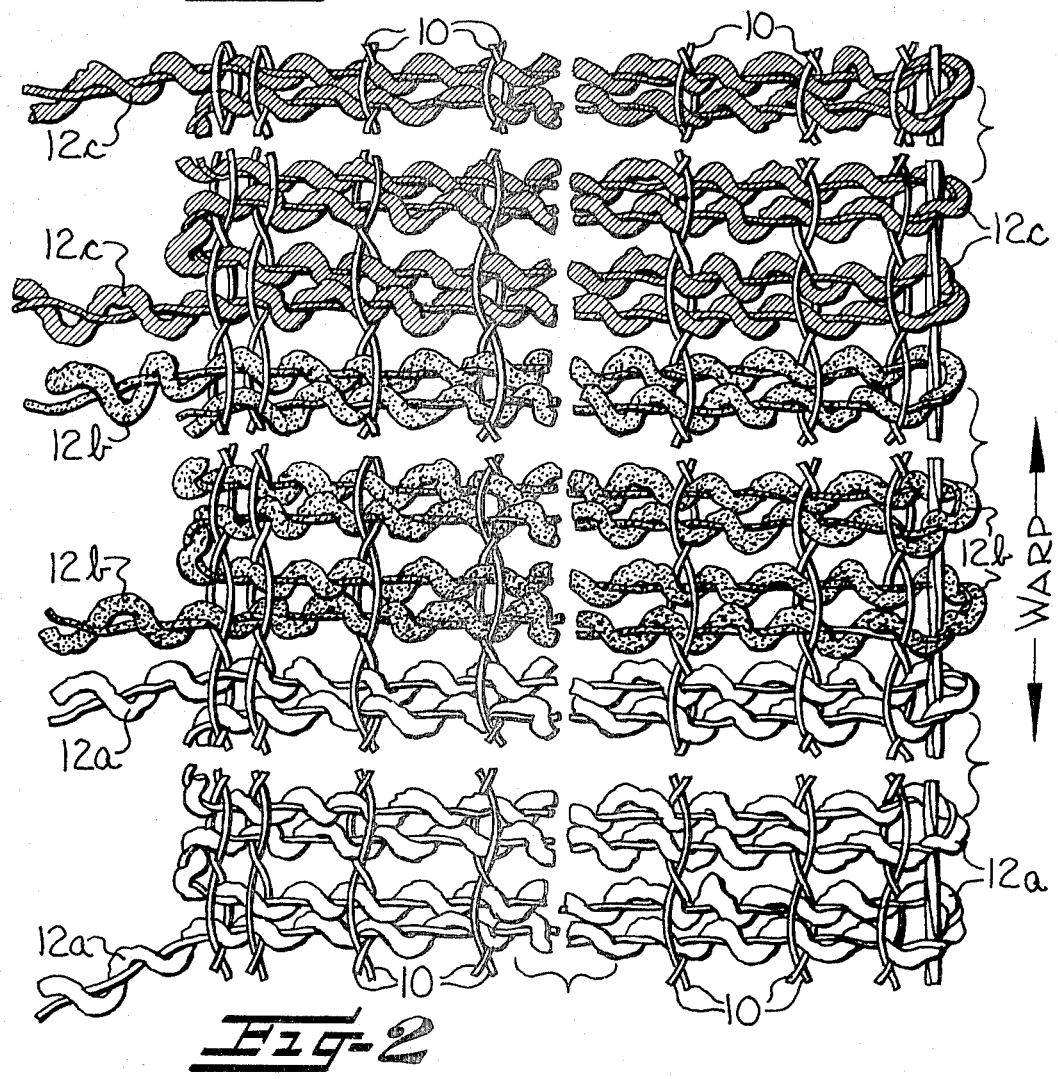

FIG. 2 illustrates a leno weave construction wherein the warp yarns and filling yarns are the same type as those used in the embodiment of FIG. 1. However, the filling yarn 12a in the lower portion has been dyed green pursuant to Example II(d); the filling yarn 12c in the upper portion has been dyed blue pursuant to Example II(e); and the filling yarn 12b in the mid portion has been dyed orange as per Example I. This fabric has a novel striped appearance.

Figure 3:
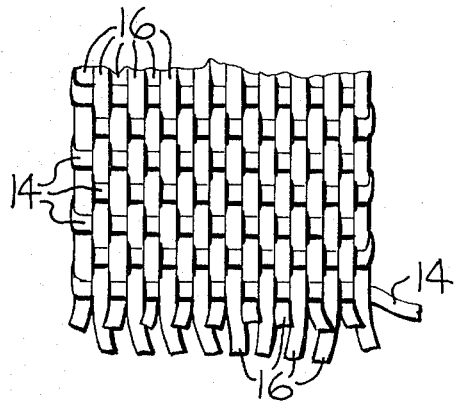

FIG. 3 illustrates an orange color woven fabric tape wherein the filling yarn comprises a 75/1/0 S. glass fiber yarn and the warp yarn comprises a pair of doubled 75/1/0 S. fiber glass yarns. The tape was woven with producer-sized yarns and was desized and finished after the weaving operation in a manner substantially as described in Example I of the present invention. More particularly, the woven tape was wound onto hollow perforated dyeing tubes and loaded into a conventional yarn package dyeing machine. After the desizing and washing operations, the tape packages were placed on a conventional narrow fabric or ribbon dyeing machine where the finish was padded onto the tape in a manner substantially as described in Example I.

Figure 4:
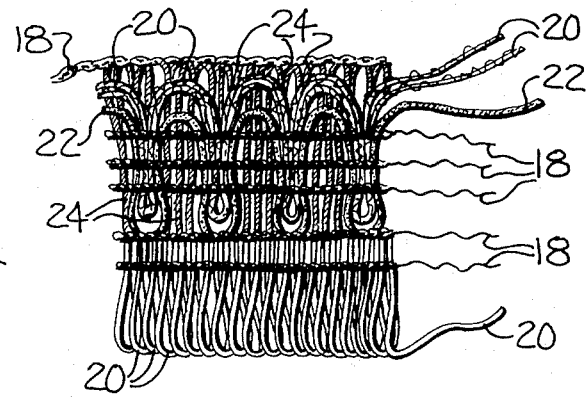
FIGS. 4-5 are enlarged plan views of knitted fabric materials.

FIG. 4 illustrates a warp knit fringe comprising (1) chain stitched 150/1/2 S. fiber glass yarns 18 which have been chemically cleaned and finished in natural condition without the use of pigments, pursuant to Example I; (2) laid-in, natural colored, Taslan bulked 65/1/2 fiber glass yarns 20 which have been processed in the same manner as the above chain stitched yarns 18; (3) a laid-in, orange, unbulked 75/3/2 fiber glass yarn 22 which has been cleaned and finished pursant to Example I, and (4) laid-in gold unbulked 130/3/4 S. fiber glass yarns 24 which have been cleaned and finished pursuant to Example II(b). The resulting multi-colored fiber glass knitted fabric has not heretofore been obtainable with known desizing and finishing procedures.

Figure 5:
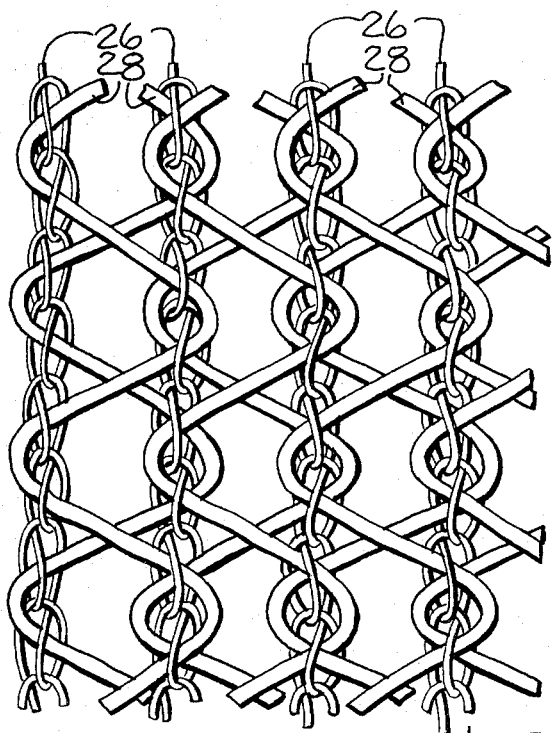
Figure 5:
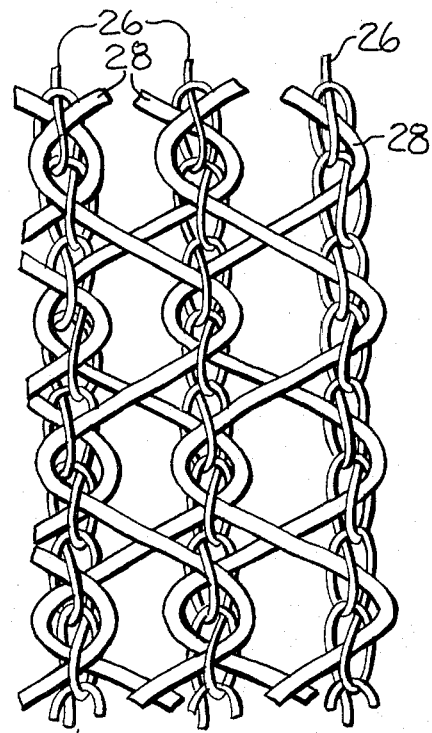

FIG. 5 shows a warp knit fabric consisting of 100 denier multi-filament polyester yarns 26 forming the stitch chains and 100/1/2 S. laid-in fiber glass yarns 28 lapped to the adjacent stitch chains. The glass yarns have been initially chemically cleaned and finished pursuant to Example I (but without the use of pigments), thus retaining their natural color. The resulting novel blend fabric will be seen to contain both polyester and glass yarns, with the glass yarns being chemically cleaned and finished in a manner to give substantially increased strength and flexibility to the fabric. It will also be appreciated that a fabric made from organic fiber yarns and producer-sized glass yarns has not heretofore been satisfactory since a conventional heat cleaning of the fabric to remove the size would have melted and destroyed the polyester yarn. The present chemical cleaning process will not hinder the polyester yarn in such a fabric.

Figure 6:
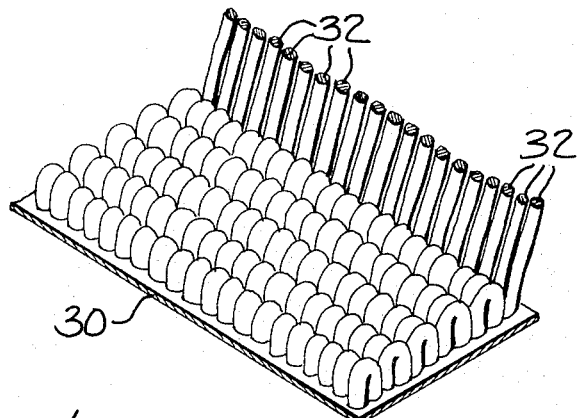
FIGS. 6-7 are perspective views of tufted pile carpet materials.

FIG. 6 shows a tufted pile carpet fabric comprising a woven jute backing 30 and penetrating fiber glass yarns 32 forming a pile face. The pile consists of 150/4/2/3 S. Taslan bulked fiber glass yarns which has been chemically cleaned and dyed pursuant to the teachings of the present invention prior to the tufting process. The carpet has been fabricated by a conventional tufting process wherein the glass yarns are inserted by needles through the interstices of woven backing at a plurality of locations.

Figure 7:
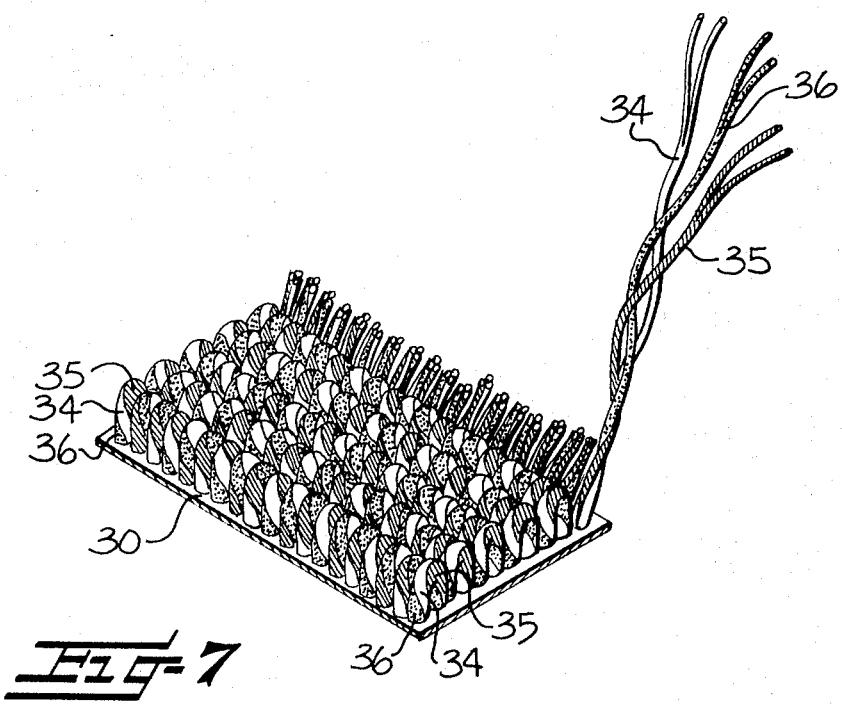

FIG. 7 shows a tufted pile carpet fabric similar to that shown in FIG. 6, but wherein three differently colored yarns 34, 35 and 36 are plied together to form a multi-colored pile yarn. In the illustrated example, the light blue, dark blue, and green yarns are combined to produce a pleasing multi-colored loop pile carpet.

Previous attempts to produce an acceptable carpet from fiber glass yarns have not met with success since pile fabric formed from producer-sized yarns could not be satisfactorily cleaned and finised. In particular, if conventional heat cleaning is attempted, the yarns are degraded in strength, flexibility and abrasion resistance to the point where use of the material as a carpet is precluded. Also, application of the required heat would tend to destroy the woven backing if a material other than glass (e.g. jute) is utilized. Then, even assuming that the tufts forming the pile face of the fabric could be adequately cleaned, it would be difficult if not impossible to coat the carpet with a suitable coloring material in such a way as to obtain a satisfactory appearance throughout the entire height of the piles. Nor would it be possible to adequately coat and lubricate the individual fibers to prevent abrasion. In addition, a multi-colored carpet or a carpet formed from multicolored yarns such as that illustrated in FIG. 7 could not be produced heretofore.

The present invention overcomes these difficulties by chemically cleaning and finishing the yarn prior to the fabrication of the carpet. Not only does this avoid the above problems, but, as is evident from the above test results, it will also enhance the tensile strength, flexibility and abrasion resistance as compared to carpet fabricated from a producer-sized yarns. The importance of these properties in a carpeting material will be obvious. The finished yarns of the present invention also have been found to possess sufficient bending and flexing strength and running characteristics to undergo the required manufacturing or tufting process without damage or breakage.

It will be appreciated by those skilled in the art that the above described carpet is susceptible to a great many pattern and coloring variations. Also, the pile yarns could be a blend of glass fiber yarns and other conventional carpeting materials such as nylon, wool, polyesters, polyolefins, acrylics, etc. Similarly, other materials such as cotton or glass fibers could be employed as an alternative for the woven jute backing of the illustrated embodiment. It will also be understood that an anti-static agent such as conductive carbon and/or a bacteriostatic agent such as Hexaclorophene (2,2'methylenebis-(3,4,6 - trichloro) phenol produced by Sindar Corp.) could be added to the yarn finish.

In the specification there has been set forth a preferred embodiment of the invention and, although specific terms are employed, they are used in a generic and descriptive sense only, and not for pupose of limitation, the scope of the invention being defined in the claims.

We claim:

1. A method of producing a desized glass fiber textile material from a sized glass textile material in a manner which does not degrade the physical properties thereof comprising, chemically desizing the textile material by forcing a solution containing a size solubilizing chemical through the material while confining the material in wound package form.

2. The method as defined in claim 1 wherein the sized glass textile material comprises a starch size, and the size solubilizing chemical includes a starch solubilizing enzyme.

3. The method as defined in claim 2 comprising the further subsequent step of applying a finish to the material by forcing a solution containing the finish through the package.

4. The method as defined in claim 3 wherein the sized glass textile material is a yarn.

5. The method as defined in claim 2 comprising the further subsequent steps of washing the desized material, and thereafter applying a finish thereto.

6. The method as defined in claim 5 wherein the finish is applied by padding the same onto a running length of the material.

7. The method as defined in claim 5 wherein the finish is a pigment containing resin binder which is subsequently cured after application.

8. A method of producing a desized glass yarn from a sized glass yarn in wound package form and in a manner which does not degrade the physical properties thereof comprising chemically desizing the yarn by forcing a size solubilizing chemical through the package.

9. A method of producing a desized and finished glass yarn from a starch sized twisted and bulked glass yarn in wound package form and in the absence of a heat degrading temperature comprising, chemically desizing the yarn by forcing a solution containing a starch converting enzyme through the package, washing the desized yarn with an aqueous solution, drying the yarn, and subsequently applying a finish thereto.

10. A method for producing glass textile fabrics which comprises, chemically desizing a producer sized glass yarn by forcing a solution containing a size solubilizing chemical through the yarn while confining the same in wound package form, finishing the desized yarns, and forming the finished yarns into a fabric.

11. The method according to claim 10 wherein the size solubilizing chemical includes a starch solubilizing enzyme.

12. The method according to claim 11 wherein the desized yarns are finished by forcing a solution containing the finish through the yarn while confining the same in wound package form.

13. A method according to claim 11 wherein the desized yarns are finished by applying a pigment-containing resin binder thereto, which binder is subsequently cured after application.

14. The method according to claim 13 wherein the yarn is finished while rewinding such yarn from the package onto another package by padding the same onto a running length of the yarn.

15. The method according to claim 11 wherein said fabric is a tufted pile fabric formed by inserting loops of the finished yarns through a fabric backing.

16. The method of desizing and finishing glass textile fabrics formed from producer-sized glass textile yarns which comprises, chemically desizing the fabric by forcing a solution containing a size converting enzyme through the fabric while confining the fabric in wound package form, and finishing the desized fabric.

17. The method according to claim 16 wherein the fabric is finished in wound package form by forcing a solution containing the finish through the package.

18. The method according to claim 16 wherein the desized fabric is finished by padding a pigment containing resin binder onto a running length of the fabric, which binder is subsequently cured after application.

19. A glass fiber textile material produced according to the method of claim 1.

20. A glass fiber textile material as defined in claim 19 wherein said textile material comprises twisted and bulked yarn.

21. A glass fiber textile material as defined in claim 19 wherein said textile material comprises interlaced glass fiber yarns and non-glass yarns.

22. A chemically desized glass yarn produced according to the method of claim 8, said yarn having a cured resin finish adhered directly to the surface thereof.

23. A tufted pile fabric comprising looped yarns inserted through a fabric backing, said yarns comprising twisted and bulked glass fibers desized and finished according to the method of claim 9.

References Cited

UNITED STATES PATENTS

| | | | |
|---|---|---|---|
| 1,859,084 | 5/1932 | Gore et al. | 8—138 |
| 3,382,135 | 5/1968 | Adams | 8—138 |
| 3,019,140 | 1/1962 | Kilby et al. | |

OTHER REFERENCES

"Production, Processes, and End-Uses of Continuous Filament Glass Fibre," The Textile Manufacturer, December 1963, pp. 530–533.

ROBERT F. BURNETT, Primary Examiner

LINDA C. KOECKERT, Assistant Examiner

U.S. Cl. X.R.

8—138; 28—72.2; 57—153; 117—54; 161—89, 175; 206—59 A